United States Patent [19]

Nakano et al.

[11] Patent Number: 5,043,816
[45] Date of Patent: Aug. 27, 1991

[54] ELECTRONIC STILL CAMERA INCLUDING PHOTOGRAPHING TIMING CONTROL

[75] Inventors: Harumi Nakano; Akihiro Tsukamoto, both of Tokyo, Japan

[73] Assignee: Casio Computer Co., Ltd., Tokyo, Japan

[21] Appl. No.: 454,059

[22] Filed: Dec. 20, 1989

[30] Foreign Application Priority Data

Dec. 26, 1988 [JP] Japan ............... 63-328179
Dec. 26, 1988 [JP] Japan ............... 63-328180
Dec. 26, 1988 [JP] Japan ............... 63-328181
Dec. 26, 1988 [JP] Japan ............... 63-328182
Dec. 26, 1988 [JP] Japan ............... 63-328183

[51] Int. Cl.⁵ .................. H04N 5/30; H04N 5/225
[52] U.S. Cl. ........................... 358/209; 358/909; 358/906
[58] Field of Search ........ 358/209, 909, 906, 213-223, 358/105

[56] References Cited

U.S. PATENT DOCUMENTS

| 4,057,830 | 11/1977 | Adcock . | |
| 4,163,256 | 7/1979 | Adcock ................... | 358/127 |
| 4,302,776 | 11/1981 | Taylor et al. ............ | 358/160 |
| 4,315,282 | 2/1982 | Schumacher ............ | 358/107 |
| 4,456,931 | 6/1984 | Toyoda et al. .......... | 358/906 |
| 4,489,351 | 12/1984 | d'Alayer de Costemore d'Arc . | |
| 4,553,175 | 11/1985 | Baumeister .............. | 358/906 |
| 4,647,976 | 3/1987 | Nakagaki et al. ........ | 358/909 |
| 4,691,253 | 9/1987 | Silver . | |
| 4,714,962 | 12/1987 | Levine ..................... | 358/909 |
| 4,742,369 | 5/1988 | Ishii et al. ............... | 358/909 |
| 4,746,988 | 5/1988 | Nutting et al. .......... | 358/909 |
| 4,802,018 | 1/1989 | Tanikawa et al. ....... | 358/906 |
| 4,827,347 | 5/1989 | Bell ........................ | 358/906 |

FOREIGN PATENT DOCUMENTS 60-46878 10/1985 Japan .
1218284 8/1989 Japan .

*Primary Examiner*—Howard W. Britton
*Assistant Examiner*—Michael H. Lee
*Attorney, Agent, or Firm*—Frishauf, Holtz, Goodman & Woodward

[57] ABSTRACT

An electronic still camera is equipped with a semiconductor memory in which a plurality of images photographed in a shutter standby condition are temporarily stored. An image taken when the shutter is depressed can be substituted with any image among the plural images which have been stored in the semiconductor memory. The image having the least blurring phenomenon among the plural images which have been stored in the semiconductor memory is detected and recorded on a non-volatile memory.

31 Claims, 11 Drawing Sheets

| MODE | OPERATION | SWITCH | | | MONITOR |
|---|---|---|---|---|---|
| | | SW1 | SW2 | SW3 | |
| SIGNAL PHOTOGRAPHING MODE | SHUTTER STANDBY | × | × | × | a |
| | SHUTTER ON | ○ | × | × | a |
| BEFORE/AFTER PHOTOGRAPHING MODE | SHUTTER STANDBY | × | ○ | × | a |
| | SHUTTER ON | ○ | ○ | × | a |
| CORRECTING MODE | SETTING | × | × | × | b |
| | RECORDING | × | × | ○ | b |
| REPRODUCING MODE | REPRODUCING | × | × | × | c |

| SHUTTER SPEED | EXPOSURE |
|---|---|
| SET SPEED | SET EXPOSURE |
| SET SPEED | -1 STEP |
| SET SPEED | +1 STEP |
| -1 SPEED | SET EXPOSURE |
| -1 SPEED | -1 STEP |
| -1 SPEED | +1 STEP |
| +1 SPEED | SET EXPOSURE |
| +1 SPEED | -1 STEP |
| +1 SPEED | +1 STEP |

FIG.15

ELECTRONIC STILL CAMERA INCLUDING PHOTOGRAPHING TIMING CONTROL

BACKGROUND OF THE INVENTION

1. Field of the Invention

The present invention relates to an electronic still camera equipped with an image memory.

2. Description of the Related Art

Various types of electronic still cameras have been widely utilized in which images are electronically recorded on a recording medium such as a magnetic disk and magnetic tape instead of a film. As a typical electronic still camera, there are two U.S. Pat. Nos. 4,057,830 and 4,163,256 issued to Adcock by Texas Instruments Incorporated. These U.S. patents disclose the electronic still camera employing the magnetic tape. On other hand, U.S. Pat. No. 4,553,175 issued to Baumeister by Eastman Kodak Company describes the electronic still camera employing the magnetic disk. Any of these electronic still cameras opened in these U.S. patents utilizes the magnetic recording apparatus, so that a large quantity of images can be recorded thereon at low cost. However, there are problems in that the accessing speed for the recorded image data is rather slow, and also in that complex image signal process, e.g., editing cannot be satisfactorily performed since images are recorded in the analog form.

On the other hand, another types of electronic still cameras have been proposed in which the digital image data are stored in a semiconductor memory. These digital image types of electronic still cameras are known from, for instance, U.S. Pat. No. 4,489,351 issued to d'Alayer de Costemore d'Arc by Staar S.A.; U.S. Pat. No. 4,691,253 issued to Silver by Polaroid Cooperation; and, U.S. Pat. No. 4,647,976 issued to Nakagaki et al. by Victor Company. Such digital still cameras have particular advantages. Once the digital image data are stored in the semiconductor memory, and even if the stored image data are dubbed many times, there is practically no deterioration in the image quality. As a result, the editing operation of the stored digital data is available. Also, the electronic still camera equipped with the editing function is known from, e.g., Schumacher U.S. Pat. No. 4,315,282 by Electronic Devices Incorporated.

Furthermore, U.S. Pat. No. 4,302,776 issued to Taylor et al. by Micro Consultants Limited describes the electronic still camera capable of storing digital image data on magnetic disk.

As previously described, various patents relating to electronic still cameras have been issued. Moreover, electronic still cameras employing floppy disks in the analog recording system have been very recently marketed by several firms.

However, all of the above-described electronic still cameras do not provide satisfaction in view of camera usage by an operator. That is, the functions of the presently available electronic still cameras are substantially the same as those of the traditional film type cameras except that the image data can be immediately reproduced and erased. As a consequence, generally speaking, the conventional electronic cameras commonly own the traditional problems of the film type cameras. For instance, since the traditional film type and electronic still cameras photograph an instant condition of an object to be imaged, a photographer may lose a chance for taking a good picture. Upon depressing a camera shutter, a model may happen to close her eyes. Also upon manipulating a camera shutter, a child or an automobile may pass through a photographing scene. In such difficult cases, the photographing results cannot be confirmed unless the image data are reproduced, or the pictures are printed out. Only after observing the reproduced image data or printed pictures, can the photographer recognize whether or not he took a good picture. In other words, there is no way for a photographer to confirm whether or not he has taken a good picture with the traditional film type cameras as well as the conventional electronic still cameras while he is actually taking pictures.

SUMMARY OF THE INVENTION

The present invention has been made in an attempt to solve the above-described problems of the conventional electronic still cameras, and therefore has an object to provide a novel electronic still camera capable of confirming the taking of a better picture, and also of finely adjusting the image timing.

To achieve the above-described object of the invention, an electronic still camera including photographing means and a shutter, according to a preferred embodiment of the invention, comprises photographing control means, temporary storage means, storage means, and selecting means.

The photographing control detects a shutter stand-by condition so as to photograph a plurality of images at a predetermined time interval, and detects a shutter operation in order to photograph a single image.

The temporary storage is made of a semiconductor memory and temporarily stores the image data photographed as a result of said photographing control wherein the image data photographed in said shutter stand-by condition are discriminated from the single image data photographed when the shutter is operated.

The storage is made of nonvolatile memory; and, the selecting means enables selection of one piece of the image data stored in said temporary storage means to be stored into said storage.

With the above-described arrangement, the electronic still camera of the present invention can provide particular advantages. That is, when a model closes her eyes or blurring occurs upon depressing shutter, the fine photographing timing control can be performed so that better images can be obtained.

BRIEF DESCRIPTION OF THE DRAWINGS

The above-described object and other novel features of the present invention will be apparent while reading the following descriptions in conjunction with the accompanying drawings, in which.

DETAILED DESCRIPTION OF THE PREFERRED EMBODIMENTS

Overall Circuit Arrangement of First Electronic Still Camera

Figure 1:
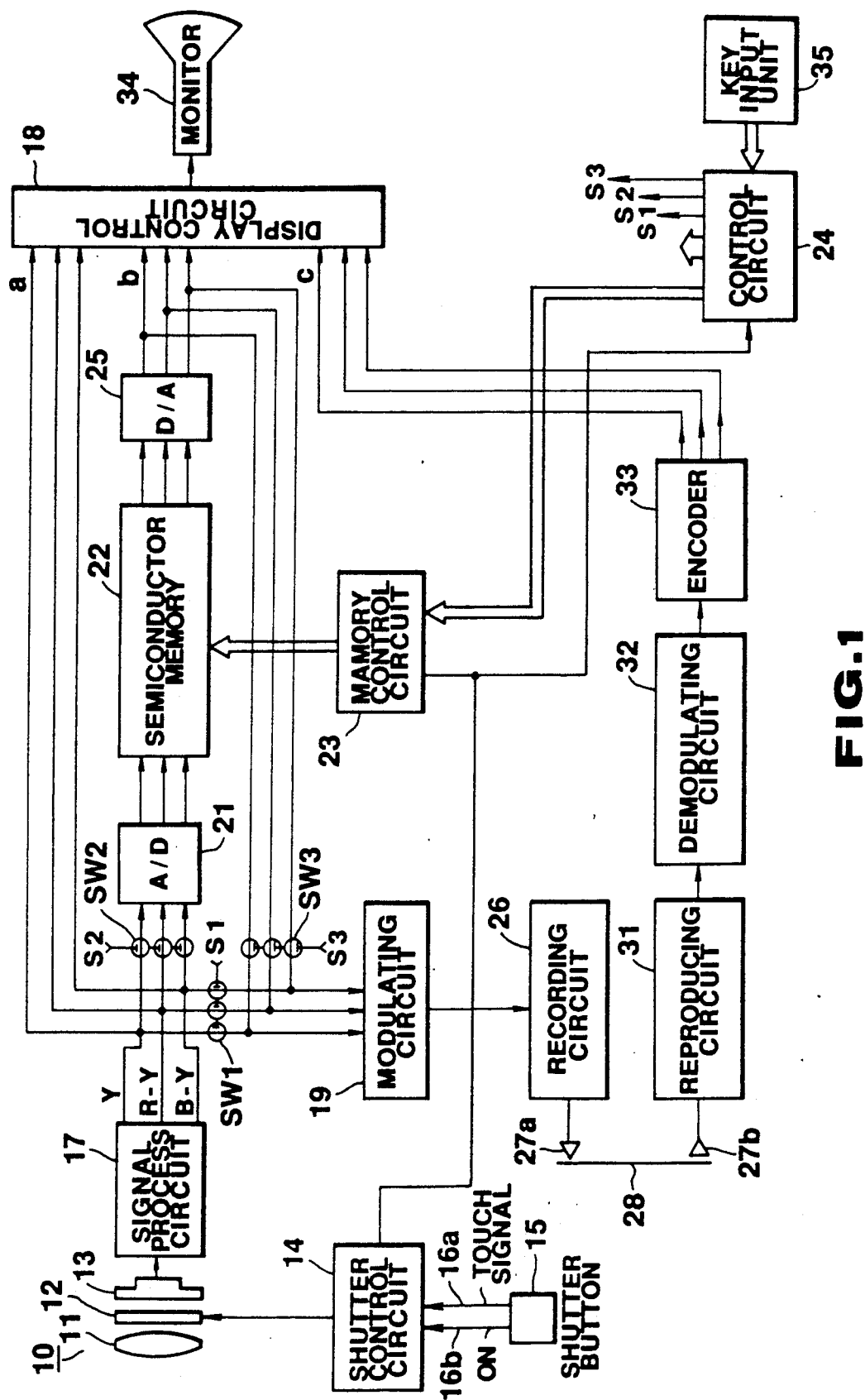
FIG. 1 is a schematic block diagram of an entire circuit arrangement of an electronic still camera according to a first preferred embodiment.

Referring now to FIG. 1, a circuit arrangement of an electronic still camera according to a first preferred embodiment of the present invention will be described.

In the circuit diagram of FIG. 1, an optical system 10 is arranged by a lens 11, a shutter 12, an imaging element 13 such as CCD (charge-coupled device), and the like. In this optical system 10, a focusing and an exposure and so on can be automatically controlled by an auto-focusing mechanism and an automatic exposure mechanism. These auto-focusing mechanism and automatic exposure mechanism themselves are known in the art, for instance, from U.S. Pat. No. 4,185,191 issued to Stauffer by Honeywell Inc. No further description will be made in the following description. A shutter control circuit 14 is employed so as to control the shutter 12 in response to a depression of a shutter button 15. The shutter button 15 is electrically connected by signal lines 16a and 16b to the shutter control circuit 14. When an operator touches on the shutter button 15 by his finger, a touch signal is sent via the signal line 16a to the shutter control circuit 14. Then, when the shutter button 15 is depressed, an ON signal is output via the signal line 16b to the shutter control circuit 14. In accordance with the shutter control circuit 14, when the touch signal is transferred from the shutter button 15, both the focusing and exposure are controlled by the auto-focusing mechanism and automatic exposure mechanism. Furthermore, the photographing operation is commenced in response to the set photographing mode. For instance, the shutter 12 is actuated every 1/120 seconds at 1/10 seconds interval.

Figure 2:
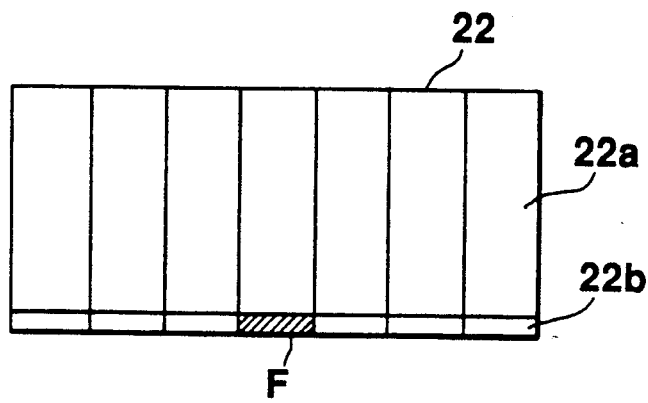
FIG. 2 schematically illustrates a storage arrangement of the semiconductor memory shown in FIG. 1.

Thereafter, in conjunction with the shutter operation of the shutter 12, an image of an object to be photograph is projected through lens 11 and shutter 12 onto an incident surface of the imaging element 13. A signal corresponding to the projected image, i.e., an image signal derived from the imaging element 13 is sent to a signal process circuit 17. In this signal process circuit 17, the incoming image signal is processed so as to produce a luminance signal "Y" and color difference signals "R-Y" and "B-Y". These signals are output via a signal line "a" a display control circuit 18. Similarly, these signals output from the signal process circuit 17 are supplied via a switch SW1 to a modulating circuit 19, and also via another switch SW2 to an analog-to-digital converting circuit 21 (referred to as "an A/D converting circuit"). These switches SW1 and SW2 are turned ON/OFF under the control of switch signals S1 and S2 derived from the control circuit 24. The A/D converting circuit 21 converts both the luminance signal Y and color difference signals "R-Y" and "B-Y" sent from the signal process circuit 17 into corresponding digital data, and then outputs these digital data to an image memory, for instance, a semiconductor memory 22. This semiconductor memory 22 has a memory capacity for storing a plurality of images, e.g., 21 sheets of the images. As shown in FIG. 2, flag areas 22b are provided with respect to image storage areas 22a in the image memory. The image data sent from the A/D converting circuit 21 are sequentially stored in the semiconductor memory 22 under the control of a memory control circuit 23. When a image data overflow occurs, the image data which has been stored at a first time is rewritten by new image data. Such an image data rewriting operation is continued while further image data are successively input. The memory control circuit 23 is supplied with both a control signal from a control circuit 24 and a shutter signal from the shutter control circuit 14. The functions of the memory control circuit 23 are as follows. In a specific operation mode, when the touch signal of the shutter button 15 is supplied from the shutter control circuit 14, the image data write control to the semiconductor memory 22 is commenced. Thereafter, when the ON signal of the shutter button 15 is supplied to this shutter control circuit 14, a shutter flag "F" is set to the flag area 22b corresponding to the image data stored in the semiconductor memory 22, and subsequently, the image data write control for the semiconductor memory 22 is continued for 1 second.

Then, the image data stored in the semiconductor memory 22 is read out to a digital to analog converting circuit 25 under control of the memory control circuit 23. Accordingly, the image data is converted into a corresponding analog signal. The resultant analog signal is supplied via a signal line "b" to the display control circuit 18, and also via a switch SW3 to the modulating circuit 19. This switch SW3 is turned ON/OFF in response to a switch signal "S3" supplied from the control circuit 24. This modulating circuit 19 modulates either a signal supplied via the switch SW1 from the signal process circuit 17, or another signal supplied via the switch SW3 from the D/A converting circuit 25, and outputs the modulated signal to a recording circuit 26. The function of this recording circuit 26 is to record the above-described signal supplied from the modulating circuit 19 on an image recording medium, for instance, a floppy disk 28 via a recording head 27a. The memory capacity of this floppy disk 28 is capable to store, for instance, approximately 50 sheets of images.

In the reproducing mode, the image recorded on the floppy disk 28 is reproduced by a reproducing head 27b (generally speaking, this reproducing head is commonly used with the recording head 27a), and the reproduced image signal is furnished to a demodulating circuit 32 via a reproducing circuit 31. The function of this demodulating circuit 32 is to demodulate the reproduced signal so as to input the demodulated signal into an encoder 33. As a result, the encoded signal is returned to the original luminance signal "Y" and color difference signals "R-Y" and "B-Y", which will be output to the display control circuit 18. The function of this display control circuit 18 is to select the image signals input via the three signal lines "a", "b" and "c" in response to an instruction from the control circuit 24, and to output the selected image signal into a monitor 34 such as a cathode-ray tube for the display purpose.

A shutter-ON signal derived from the shutter control circuit 14 is supplied to the control circuit 24 to which a key input unit 35 is connected. There are provided various operation keys on this key input unit 35: a photographing mode selecting key for selecting a normal single photographing mode and a before/after photographing mode: an operation mode designating key for designating a photographing mode, a reproducing mode, a correcting mode and the like; forward/backward keys for proceeding/returning a read address of the semiconductor memory 22 in the correcting mode; and, a recording key for instructing the floppy disk 28 to start the recording operation. The functions of the control circuit 24 are to turn ON/OFF the switches SW1, SW2, SW3 in response to the key input signal from the key input unit 35, and the shutter-ON signal from the shutter control circuit 14, and also to give control instructions to the memory control circuit 23, display control circuit 18, and other relevant circuits.

VARIOUS OPERATION MODES

Referring now to flowcharts, various operations of the electronic still camera according to the first preferred embodiment will be described.

Figure 3:
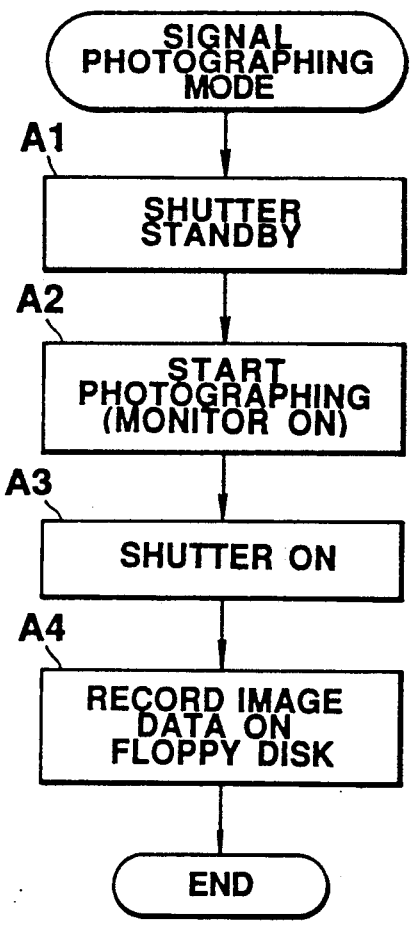
FIG. 3 is a flowchart for explaining an operation when a single photographing mode is designated according to the first preferred embodiment.

When the first embodiment of the electronic still camera is operated in a similar photographing mode to the traditional film type camera, a single photographing mode is selected by operating the photographing mode selecting key provided on the key input unit 35. Upon designation of the single photographing mode, the control circuit 24 starts a control operation as defined in a flowchart shown in FIG. 3. That is, this control circuit 24 outputs a single photographing mode signal to the shutter control circuit 14 and memory control circuit 23, when the single photographing mode is designated, and turns OFF these switches SW1, SW2, SW3 and furthermore instructs the display control circuit 18 to select the signal line "a". Under this condition, when a photographer softly touches the shutter button 15 with his finger, the touch signal is sent to the shutter control circuit 14 whereby a shutter standby mode is set (step A1). Upon receipt of the touch signal, the shutter control circuit 14 controls the auto-focusing mechanism and automatic exposure mechanism so as to adjust both the focusing and exposure, and also actuates the shutter 12 at a rate of 1/10 sec. A single shutter-ON time is selected to be, for instance, 1/120 sec. As a result, the image of the object (not shown) to be photographed is optically projected via the lens 11 and shutter 12 onto the imaging surface of the imaging element 13. Then, both the luminance signal "Y", and color difference signals "R-Y" and "B-Y" are output from this imaging element 13 in accordance with the projected image, and are transferred via the signal line "a" to the display control circuit 18. The display control circuit 18 selects the signal sent via the signal line "a" in response to the instruction from the control circuit 24 and supplies this selected signal to the monitor 34 for the display purpose (step A2). The photographer can confirm the conditions of the object to be imaged by observing the monitor, so that the shutter operation is prepared. When the photographer depresses the shutter button 15 (step A3), the ON-signal is sent to the shutter control circuit 14. Upon receipt of the ON signal, the shutter control circuit 14 outputs this On signal to the control circuit 24, and thereafter interrupts the shutter operation for a moment. When the shutter-ON signal is transferred from the shutter control circuit 14, the control circuit 24 turns ON the switch SW1 for a constant time, e.g., 1/120 sec. While this switch SW1 is turned ON, the imaging signals output from the signal process circuit 17, namely the luminance signal "Y" and color difference signal "R-Y" and "B-Y" are transferred to the modulating circuit 19 and the modulated imaging signals are input to the recording circuit 26. The recording circuit 26 drives the recording head 27a in response to the modulated signal from the modulating circuit 19, and records the image signal on the floppy disk 28 (step A4). Then, when the switch SW1 is turned OFF, the shutter control circuit 14 judges whether or not there is a touch signal supplied from the shutter button 15. If the touch signal has been sent, the control operation of the shutter 12 is again commenced. Subsequently, the above-described photographing operation is sequentially performed.

Figure 4:
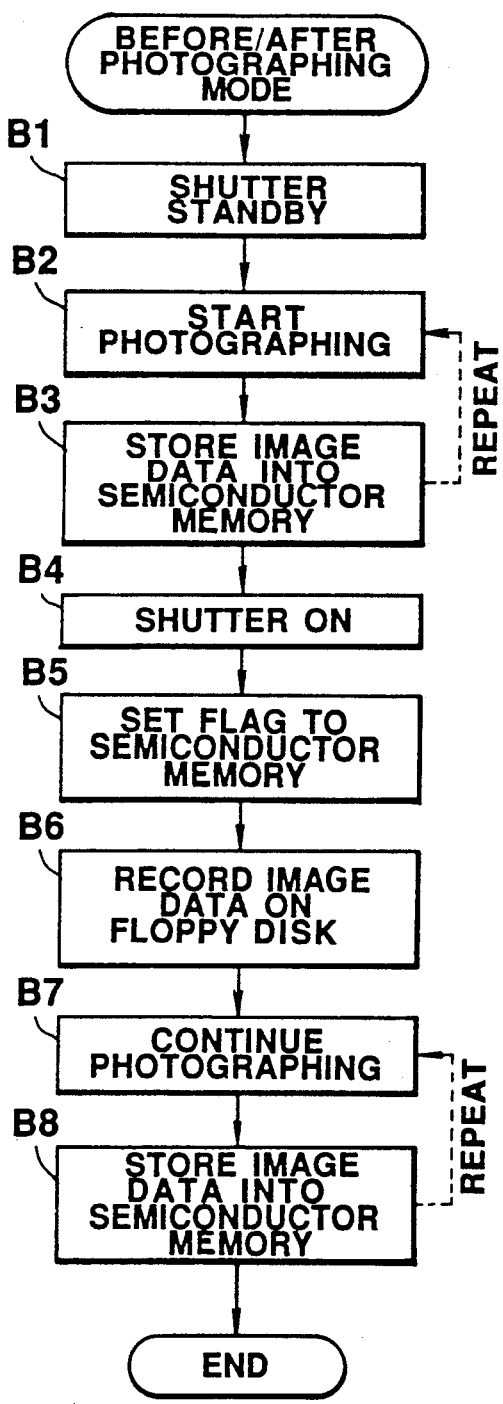
FIG. 4 is a flowchart for explaining another operation when a before/after photographing mode is designated according to the first preferred embodiment.

In the single photographing mode, the image recording operation to the floppy disk 28 is restricted to the case when the shutter button 15 is depressed. To the contrary, in case that the fine adjustment for the shutter chance is desired to be performed before/after the shutter operation, the before/after photographing mode is designated by the photographing mode selecting key. When this before/after photographing mode is designated, the control circuit 24 performs the following process as defined in a flowchart shown in FIG. 4. Under the control of the control circuit 24, the before/after photographing mode signal is output to both the shutter control circuit 14 and memory control circuit 23, the switches SW1 and SW3 are turned OFF, the switch SW2 is turned ON, and further an instruction is supplied to the display control circuit 18 so as to select the signal line "a". Under these conditions, when the photographer softly touches the shutter button 15 with his finger, the touch signal is sent to the shutter control circuit 14 and the process is advanced to the shutter stand by mode (step B1). Upon receipt of the touch signal, the shutter control circuit 14 controls the auto focusing mechanism and automatic exposure mechanism to execute the focusing and exposure controls, and actuates the shutter 12 at the rate of 1/10 sec. Thus, the image of the object under imaging is projected via the lens 11 and shutter 12 onto the imaging surface of the imaging element 13, both the luminance signal "Y" and color difference signals "R-Y" and "B-Y" are output from the imaging element 13 in response to the projected image, and then via the signal line "a" to the display control circuit 18. The display control circuit 18 selects the signal transferred from the signal line "a" in response to the control circuit 24 and displays the image on the monitor 34 (step B2). Based upon this monitor display, the photographer can confirm the conditions of the imaging object so that he can depress the shutter button 15. Furthermore, the image signal output from the signal process circuit 17 is input via the switch SW2 to the A/D converting circuit 21, and converted into the digital image data into the semiconductor memory 22. In this case, the touch signal of the shutter button 15 is supplied from the shutter control circuit 14 to the memory control circuit 23. While the touch signal is supplied, the memory control circuit 23 enables the image data output from the A/D converting circuit 21 to be sequentially written into the semiconductor memory 22 (step B3). When 10 sheets of image data have been written into the semiconductor memory 22, the image data rewriting operation is successively executed from the image data which has been written at first. That is, the image data are sequentially updated.

Then, when the photographer depresses the shutter button 15 (step B4), the ON-signal is sent to the shutter control circuit 15. Upon receipt of this ON-signal, the shutter control circuit 14 outputs the ON-signal to the memory control circuit 23 and control circuit 24, and thereafter continues the shutter control operation for a 1 second. When the shutter ON-signal is sent from the shutter control circuit 14, the memory control circuit 23 sets the flag "F" to the flag area 22b with respect to the image which has been recorded at 1/120 sec. in the semiconductor memory 22 (step B5). On the other hand, when the shutter ON-signal is supplied from the shutter control signal 14, the control circuit 24 maintains the switch SW1 under the ON state for 1/120 seconds. Furthermore, under the control of the control circuit 24, the image signal output from the signal process circuit 17 is supplied to the modulating circuit 19 for the modulation purpose, and thereafter, the modulated signal is output to the recording circuit 26 and recorded on the floppy disk 28 by the recording head 27a (step B6). After the shutter operation is accomplished, the memory control circuit 23 stores to the semiconductor memory 22 for 1 second the image data which are subsequently acquired (steps B7 and B8). As a result, when the shutter button 15 is depressed, both the image data (10 sheets of image) which have been acquired for a 1 second before the depression of the shutter button 15, and also the image data (10 sheets of image) which have been acquired for 1 second after the depression of the shutter button 15 are stored into the semiconductor memory 22 together with the image data which has been acquired during the shutter operation.

After the above-described photographing operation has been completed under such a circumstance, this operation is continued when the photographer judges that the resultant imaging is satisfactory. Conversely, if he judges that the resultant imaging is unsatisfied, a correcting mode may be designated by way of the operation mode designating key provided in the key input unit 35. When the correcting mode is designated, the control circuit 24 executes a process as defined in a flowchart shown in FIG. 5. First, under the control of the control circuit 24, a correction mode signal is output to the memory control circuit 23, and also instructs the display control circuit 18 so as to select the signal line "b". Also, when the above correcting mode is designated, under the control of the memory control circuit 23, the image data stored in the semiconductor memory 22 to which the flag "F" has been set, is read out to the D/A converting circuit 25 (step C1). Then, the image data is converted into the corresponding analog image signal which will be than output to the display control circuit 18. This display control circuit 18 selects the analog image signal derived from the D/A converting circuit 25, and delivers this analog image signal to the monitor 34. As a result, the resultant image taken when the shutter button 15 is depressed can be confirmed while observing the monitor 34. Under this condition, when either the forward key or backward key provided on the key input unit 35 is operated (step C2), this key operation signal is sent from the control circuit 24 to the memory control circuit 23 so that the read address of the semiconductor memory 22 is varied, i.e., the earlier read address or later read address is designated. Precisely speaking, if the forward key is manipulated, the next address of the semiconductor memory 22 is designated (step C3). If the backward key is depressed, the front address thereof is designated (step C4). Thus, the image data addressed by the next address, or front address is read out from the semiconductor memory 22 and supplied to the monitor 34 for the display purpose. As a consequence, when either the forward key or backward key is operated, the image data are successively read out from the semiconductor memory 22 and the read images can be successively confirmed by the photographer. Accordingly, after the images have been confirmed by the photographer, he can select a desirable image, display it on the monitor 34, and then operate the recording key. When the record key is operated, the control circuit 24 holds the switch SW3 at the ON state for a predetermined time period and inputs to the modulating circuit 19 the image signal which is read via the D/A converting circuit 25 from the semiconductor memory 22. Furthermore, under the control of the control circuit 25, the image signal is recorded via the recording circuit 26 and recording head 27a on the floppy disk 28 (step C5). In this case, the image region of the floppy disk 28 is not varied, but the image data which has been recorded just before the operation of the recording key is rewritten by the correcting image which has been read from the semiconductor memory 22. As previously described, when the photographer judges that the resultant image is unsatisfactory, he can select the desirable image from the images taken before and after the actual shutter operation so as to correct the photographed image.

When the image recorded on the floppy disk 28 is reproduced, the reproducing mode is designated. Once the reproducing mode is designated, the control circuit 24 instructs the display control circuit 18 to select the signal line "c", and reads the image data firstly recorded on the floppy disk 28 by the reproducing head 27b. The read image data is amplified by the reproducing circuit 31 and then input into the demodulating circuit 32 for the demodulating purpose. The signal demodulated by this demodulating circuit 32 is input into the encoder 33 so as to be returned to the originally produced luminance signal "Y" and color difference signals "R-Y" and "B-Y" which will then be supplied via the signal line "c" to the display control circuit 18. This display control circuit 18 selects the image signal transferred from the encoder 33 in accordance with the instruction by the control circuit 24, and supplies this selected image signal to the monitor 34 for the display purpose. Also, under this condition, when the forward key is operated, the images recorded on the floppy disk 28 are successively read and displayed on the monitor 34.

Figures 5, 6:
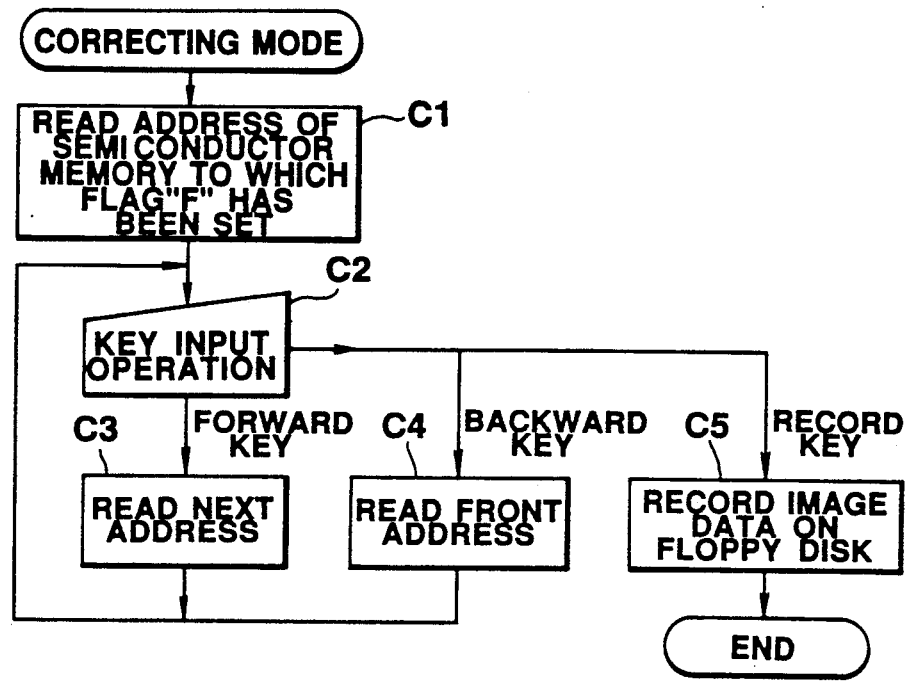
FIG. 5 is a flowchart for explaining an operation when a correction mode is designated according to the first preferred embodiment.
FIG. 6 represents a relationship between the respective designated modes and operating conditions corresponding thereto according to the first preferred embodiment.

In FIG. 6, there is represented a relationship between the operation contents of the above-described designation modes, the ON/OFF conditions of the switches SW1 to SW3, and the displayed images of the monitor 34.

MODIFICATIONS OF FIRST ELECTRONIC STILL CAMERA

In the above-described first preferred embodiment, the shutter 12 was controlled every 1/10 sec. Alternatively, if the shutter control interval may selected to be 1/500 sec. and the resultant image data are stored in the semiconductor memory 22, a further fine correction may be achieved. Conversely, one image may be taken before the shutter 12 is operated, or one image may be taken after the shutter 12 is manipulated.

Also, in accordance with the first preferred embodiment, the semiconductor memory 22 was employed as the image memory. Alternatively, other storage mediums such as a magnetic disk and optical disk may be utilized.

Furthermore, in the first preferred embodiment, the image data were recorded on the floppy disk 28, but may be exposed onto a film after these image data are once converted into analog signals by the D/A converting circuit 25.

It should be noted that although the condition where the shutter button is softly touched by the finger of the photographer was regarded as the shutter standby condition, the present invention is not limited thereto. For instance, a condition where the shutter button is depressed along a half of the overall depressing path thereof may be regarded as the shutter standby condition.

In addition, the image data taken before and after the shutter button had been depressed were recorded in the first preferred embodiment. Instead, image data taken only before, or after the shutter button is depressed may be recorded.

SECOND ELECTRONIC STILL CAMERA

A major feature of an electronic still camera according to a second preferred embodiment of the invention is as follows. An image memory for temporarily storing image data is employed, the images are recorded on a recording medium, which have been photographed by the shutter operations, and then are stored in the image memory so as to be displayed on an electronic view finder as still pictures.

According to such a particular feature of the second electronic still camera, the image data are temporarily stored in the image memory and displayed on the view finder as the still pictures. Thus, when the shutter is depressed, the image displayed on the view finder remains stationary. The picture actually taken can be immediately confirmed. If the quality of the displayed image is acceptable, then the photographing operation can be continued so that the useless photographing operation can be avoided.

Figure 7:
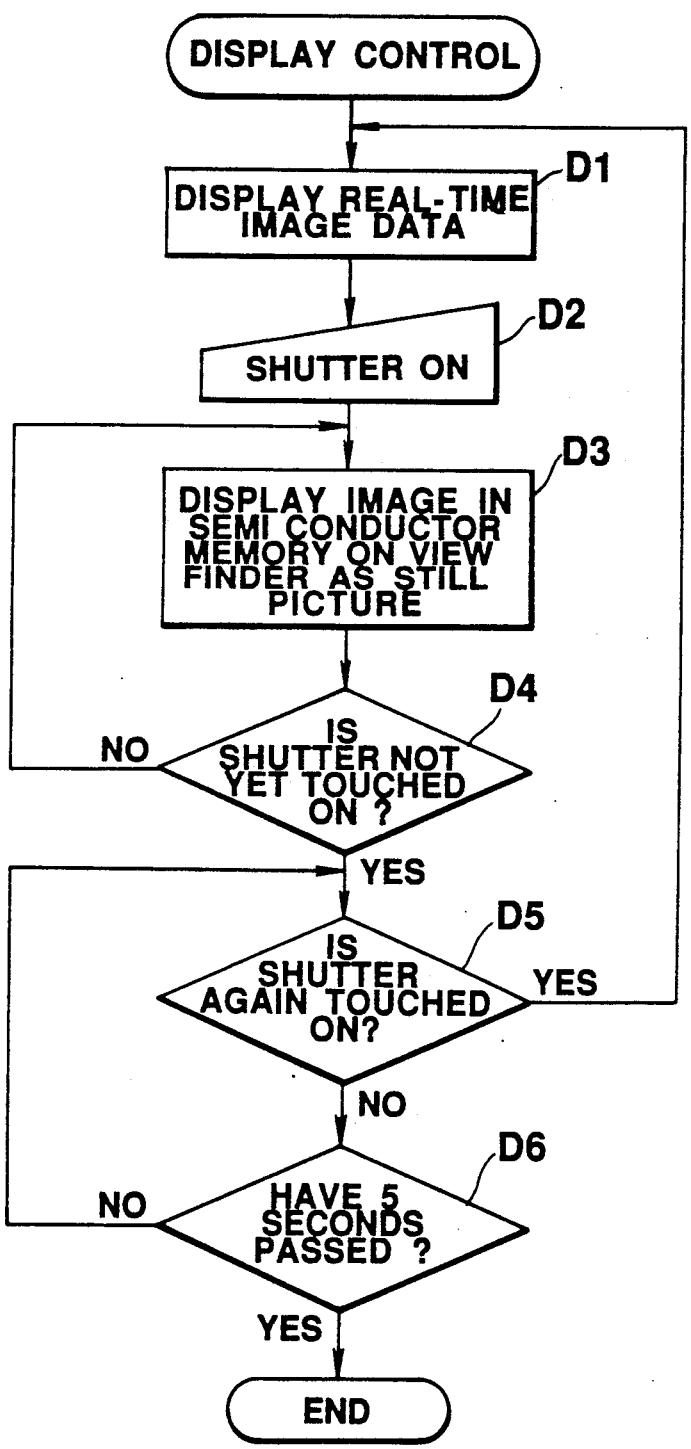
FIG. 7 is a flowchart for explaining a display control operation according to a second preferred embodiment.

It should be noted that since the circuit arrangement of the second electronic still camera is the substantially same as that of the first electronic still camera, no further explanation will be made, but the monitor 34 of the first electronic still camera is substituted by an electronic view finder. FIG. 7 is a flowchart for explaining a control operation by the control circuit 24 according to the second preferred embodiment.

PHOTOGRAPHING MODES OF SECOND ELECTRONIC STILL CAMERA

The major operation of the second electronic still camera is similar to that of the first electronic still camera.

In case of the photographing operation, the photographing mode is similarly designated by operating the operation mode designating key provided on the key input unit 35.

Then, when the single photographing mode is designated, the control circuit turns OFF these switches SW1, SW2, SW3 and furthermore instructs the display control circuit 18 so as to select the signal line "a". Under this condition, when a photographer softly touches on the shutter button 15 with his figure, the touch signal is sent via the signal line 16a to the shutter control circuit 14. Upon receipt of the touch signal, the shutter control circuit 14 controls the auto focusing mechanism and automatic exposure mechanism so actuates the shutter 12 at a rate of 1/10 sec. As a result, the image of the object (not shown) to be photographed is optically projected via the lens 11 and shutter 12 onto the imaging surface of the imaging element 13. Then, both the luminance signal "Y", and color difference signals "R-Y" and "B-Y" are output from this imaging element 13 in accordance with the projected image, and are transferred via the signal line "a" to the display control circuit 18. The display control circuit 18 selects the signal sent via the signal line "a" in response to the instruction from the control circuit 24 and supplies this selected signal to an electronic view finder 34 for the display purpose (step D1). The photographer can confirm the conditions of the object to be imaged by observing the electronic view finder, so that the shutter operation is prepared. When the photographer depresses the shutter button 15 (step D2), the ON-signal is sent via the signal line 16b to the shutter control circuit 14. Upon receipt of the ON signal, the shutter control circuit 14 outputs this On signal to the memory control circuit 23 and the control circuit 24, and thereafter interrupts the shutter operation. When the shutter-ON signal is transferred from the shutter control circuit 14, the control circuit 24 turns ON the switches SW1 and SW2 for a constant time, e.g., 1/120 sec. While this switch SW1 is turned ON, the imaging signals output from the signal process circuit 17, namely the luminance signal "Y" and color difference signals "R-Y" and "B-Y" are transferred to the modulating circuit 19 and the modulated imaging signals are input to the recording circuit 26. The recording circuit 26 drives the recording head 27a in response to the modulated signal from the modulating circuit 19, and records the image signal on the floppy disk 28.

On the other hand, since the switch SW2 is turned ON, the image signal output from the signal process circuit 17 is supplied to the A/D converting circuit 21 so as to be converted into the corresponding image data. Then, the digital image data is written into the semiconductor memory 22 under the control of the memory control circuit 23. The image data written into this semiconductor memory 22 is immediately read out and then furnished via the signal line "b" to the display control circuit 18 under the control of the memory control circuit 23. At this time, the control circuit 24 instructs the display control circuit 18 to select the signal line "b". As a result, under the control of the display control circuit 18, the image data which has been stored into the semiconductor memory 22 is displayed as the still picture, or image on the electronic view finder 34 (step D3). Then, the control circuit 24 judges whether or not his finger of the photographer touches on the shutter button 15 in response to the shutter signal derived from the shutter control circuit 14. If yes, then the above-described still picture display of the image stored in the semiconductor memory 22 is continued (step D4). Once this finger leaves from the shutter button 15, another judgement is carried out whether or not the finger of the phtographer again touches on the shutter button 15 by his finger (step D5). If the judgement is made that his finger does not yet touch on the shutter button 15, the time measuring operation is commenced, and furthermore the still picture display on the view finder 34 is continued until a constant time, e.g. 5 seconds have passed (step D6). Then, when 5 seconds have elapsed, the above-described still picture display on the view finder 34 is stopped and thus a series of the photographing operation is completed. To the contrary, if his finger of the photographer touches on the shutter button 15 before the above-described 5 seconds have passed, this condition is detected at the step D5 and the process is returned to the previous step D1 where the image of the imaging object (not shown in detail) is displayed on the electronic view finder 34. That is, the shutter control circuit 14 is brought into the standby mode since the shutter button 15 is touched by the finger. As a consequence, the control operation of the shutter 12 is commenced, the shutter touch signal is transferrd to the control circuit 24, and thus, this control circuit 24 sends the instruction to the display control circuit 18 so as to select the signal line "a". Accordingly, the image of the imaging object is displayed on the view finder 34, whereby the photographing operation can be continued.

As previously described, in case that the photographing operation is carried out by depressing the shutter button 15, the photographed image is displayed as the still picture while touching on the shutter button 15 by the photographer's finger. Then, even when the finger is removed from the shutter button 15, this photographed image is being displayed on the view finder 34 for 5 seconds. As a result of such a still picture display, the photographer can immediately observe the actually photographed picture and therefore can judge the quality of the actually photographed picture. Also, even when the photographed image is being displayed on the view finder 34, the subsequent photographing operation can be commenced by again touching on the shutter button 15 by the finger.

FILM TYPE CAMERA

Figure 8:
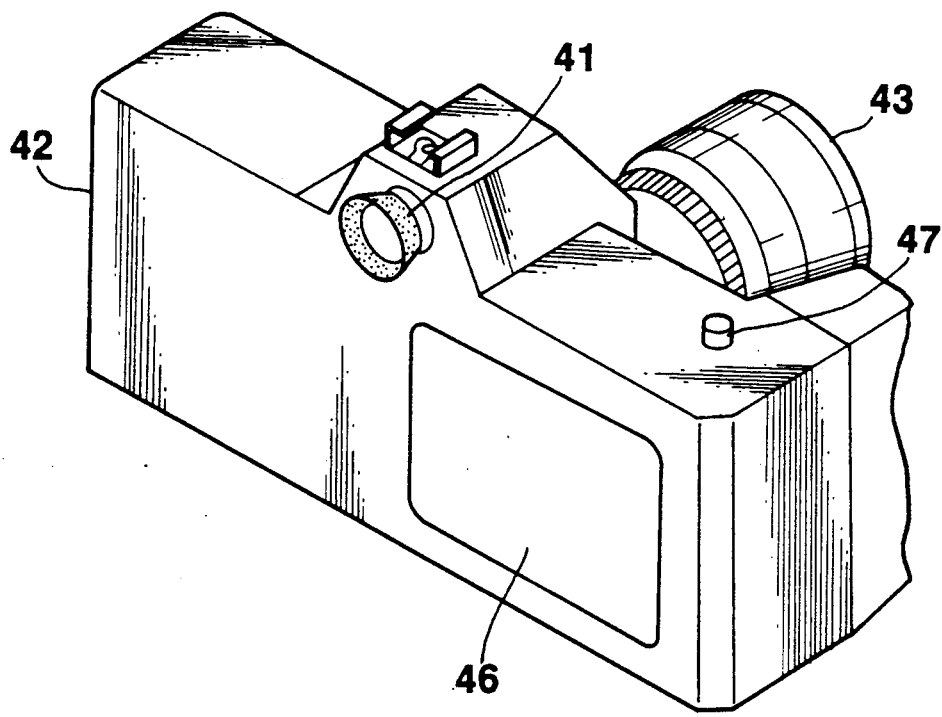
FIG. 8 is a perspective view of an electronic still camera according to the second preferred embodiment.
Figure 9A:
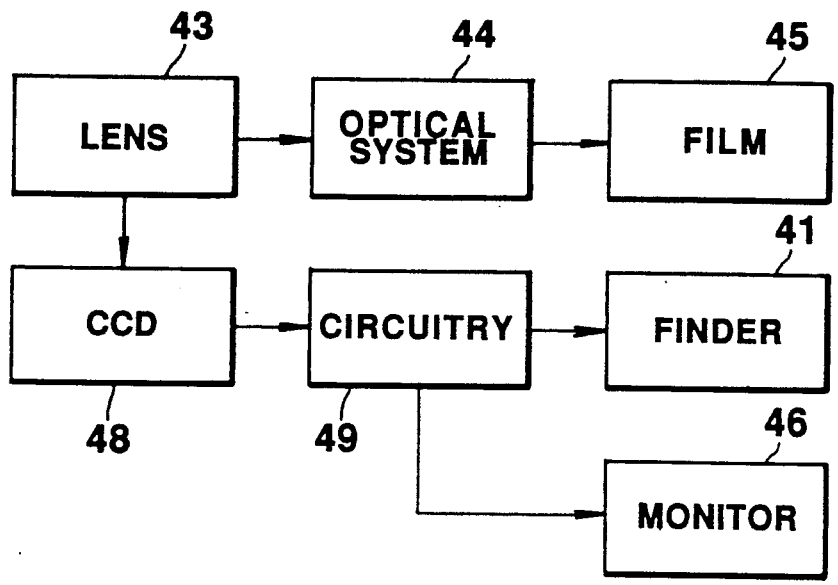
FIG. 9A is a schematic functional block diagram of the second preferred embodiment.
Figure 9B:
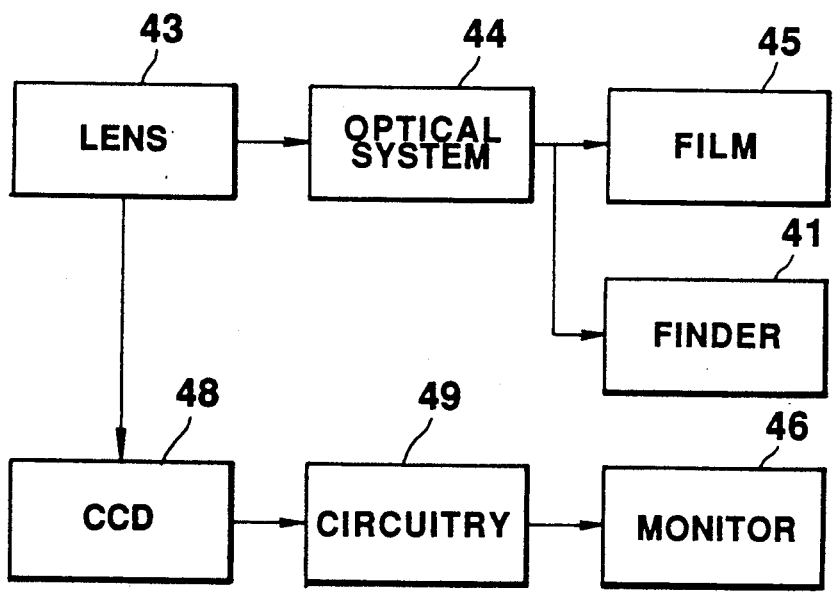
FIG. 9B is a schematic functional block diagram of a modification according to the second preferred embodiment.

Then, FIGS. 8 and 9 show one example where the present invention is applied to the traditional film type camera. That is, FIG. 8 is a perspective view of the film type camera, whereas FIGS. 9A and 9B are schematic functional block diagrams thereof. In this preferred embodiment, a view finder 41 corresponds to the above-described electronic view finder 34 shown in FIG. 1. In a main body 42 of the film type camera shown in FIG. 8, a circuit 49 shown in FIGS. 9A and 9B except for the floppy disk drive system represented in FIG. 1 is built. An image photographed by the lens 43 is optically and chemically recorded on a film 45 via an optical system 44. A monitor 46 is connected to the finder 41 and also circuit 49. Then, when the shutter 47 is depressed, the photographed image is displayed as the still picture on both the view finder 41 and monitor 46. In accordance with the operation flow shown in FIG. 7, the still picture display on the view finder 41 is released after 5 seconds, whereas the still picture is continuously displayed on the monitor 46 until the shutter 47 is again depressed.

As apparent, FIGS. 9A and 9b illustrate different modes, respectively. FIG. 9A represents that the image taken by CCD 48 displayed on the view finder 41. FIG. 9B represents that the view finder 41 displays the image transferred through the optical system 44. As a consequence, no still picture is displayed on the view finder 41 in FIG. 9B.

The technique which an image photographed by only one optical system is chemically and electrically recorded on a film and a CCD is known from, for instance, Japanese patent disclosure No. 61-250629 (1986) filed by the Applicant.

As previously described in detail, in accordance with the second preferred embodiment, there is employed the image memory capable of temporarily storing the image data, when the imaging object is photographed by the shutter operation, the photographed image is recorded on the recording medium and also is temporarily stored in the image memory so as to be displayed as the still picture on the view finder. As a result, the photographer can immediately confirm whether or not the desired picture has been taken, which can assure that the photogaher takes pictures without any anxiety. Moreover, since the photographing operation is simply repeated only when no desirable picture is obtained, the storage regions of the recording medium can be effectively utilized.

ARRANGEMENT OF THIRD ELECTRONIC STILL CAMERA

Figure 10:
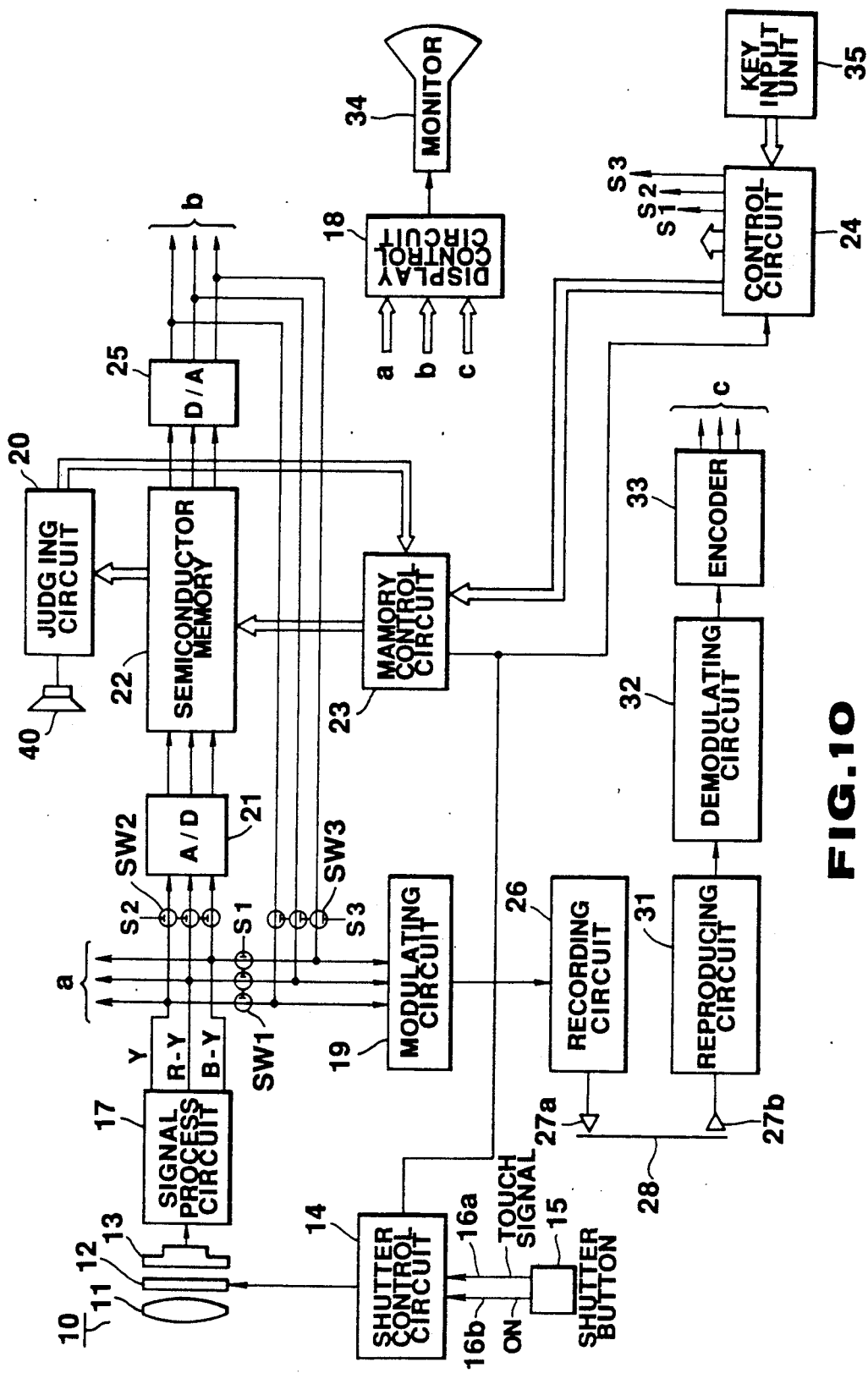
FIG. 10 is a schematic block diagram of an entire circuit arrangement of an electronic still camera according to a third preferred embodiment.

An electronic still camera according to a third preferred embodiment of the invention will now be described. FIG. 10 is a schematic block diagram of an entire circuit arrangement of the third electronic still camera. It should be noted that same reference numerals shown in FIG. 1 will be employed as those for denoting the same or similar circuit elements represented in FIG. 10, and therefore no further detailed operation is made in the following description. A different point of the circuit arrangement shown in FIG. 10 is to newly employ a judging circuit 20 for judging the memory contents of the semiconductor memory 22. This judging circuit 20 is constructed of a known microcomputer, ROM (read only memory) for previously storing a program, and a work memory. The function of this judging circuit 20 is to detect a degree of movement between a plurality of image data. A buzzer 40 is connected to the judging circuit 20.

Figure 11:
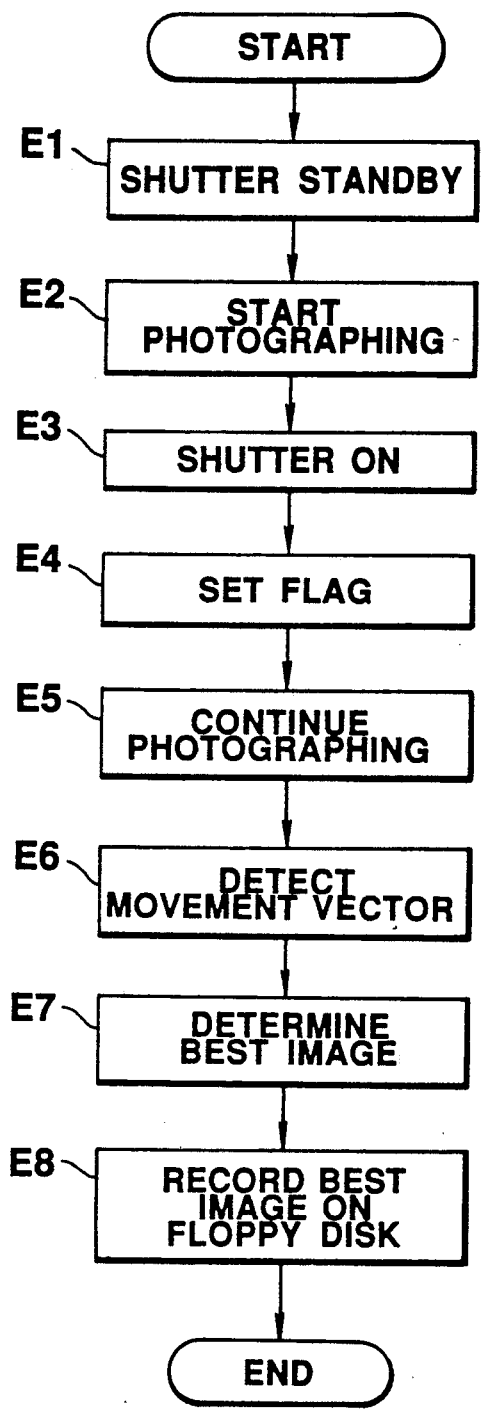
FIG. 11 is a flowchart for explaining an operation of the third preferred embodiment.

Similar to the first electronic still camera, the third electronic still camera employs both the single photographing mode and the before/after photographing mode. Then, the operations of the before/after photographing mode will be explained with reference to a flowchart shown in FIG. 11.

When this before/after photographing mode is designated, the control circuit 24 performs the following process. Under the control of the control circuit 24, the before/after photographing mode signal is output to both the shutter control circuit 14 and memory control circuit 23, and the switches SW1 and SW3 are turned OFF as well as the switch SW2 is turned ON, and further an instruction is supplied to the display control circuit 18 so as to select the signal line "a". Under these conditions, when the photographer softly touches on the shutter button 15 by his finger (step E1), the touch signal is sent to the shutter control circuit 14 and the process is advanced to the shutter standby mode. Upon receipt of the touch signal, the shutter control circuit 14 controls the auto focusing mechanism and automatic exposure mechanism to execute the focusing and exposure controls, and actuates the shutter 12 at the rate of 1/10 sec. (step E2). Thus, the image of the object under imaging is projected via the lens 11 and shutter 12 onto the imaging surface of the imaging element 13, both the luminance signal "Y" and color difference signals "R-Y" and "B-Y" are output from the imaging element 13 in response to the projected image, and then via the signal line "a" to the display control circuit 18. The display control circuit 18 selects the signal transferred from the signal line "a" in response to the control circuit 24 and displays the image on the monitor 34. Based upon this monitor display, the photographer can confirm the conditions of the imaging object so that he can depress the shutter button 15. Furthermore, the image signal output from the signal process circuit 17 is input via the switch SW2 to the A/D converting circuit 21, and converted into the digital image data into the semiconductor memory 22. In this case, the touch signal of the shutter button 15 is supplied from the shutter control circuit 14 to the memory control circuit 23. While the touch signal is supplied, the memory control circuit 23 enables the image data output from the A/D converting circuit 21 to be sequentially written into the semiconductor memory 22. When 10 sheets of image data have been written into the semiconductor memory 22, the image data rewriting operation is successively executed from the image data which has been written at first. That is, the image data are sequentially updated.

Then, when the photographer depresses the shutter button 15 (step E3), the ON-signal is sent via the signal line 16b to the shutter control circuit 15. Upon receipt of this ON-signal, the shutter control circuit 14 outputs the ON-signal to the memory control circuit 23 and control circuit 24, and thereafter continues the shutter control operation for one second. When the shutter ON-signal is sent from the shutter control circuit 14, the memory control circuit 23 sets the shutter flag "F" to the flag area 22b with respect to the image which has been recorded at 1/120 sec. in the semiconductor memory 22 (step E4). Thereafter, the writing operation of the image data to the semiconductor memory 22 is continued for one second (step E5). Accordingly, when the shutter button 15 is depressed, 10 sheets of the image which have been acquired for one second before depressing the shutter button 15, and 10 sheets of the images which have been acquired for one second after depressing the shutter button 15 are stored in the semiconductor memory 22 together with the image taken at the shutter operation.

Figure 12:
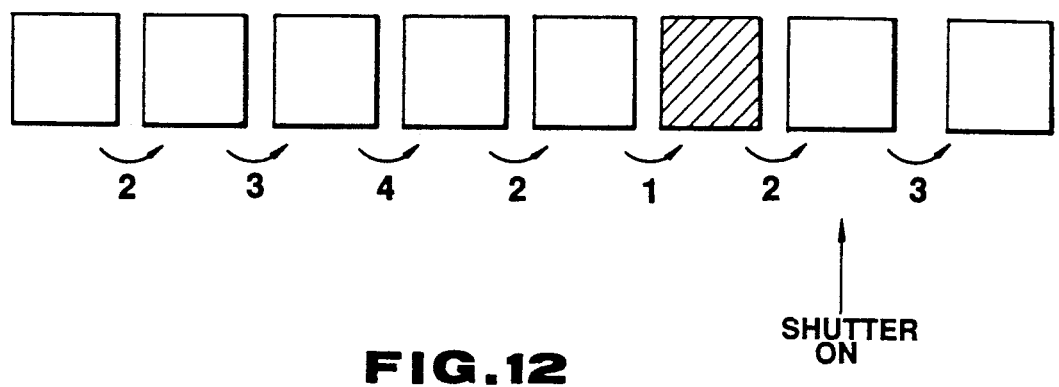
FIG. 12 is an illustration for explaining a detection on a movement degree according to the third preferred embodiment.

Then, under the control of the memory control circuit 23, when the above-described image data storage has been accomplished in the semiconductor memory 22, the image data stored in the semiconductor memory 22 are successively read and supplied to the judging circuit 20. In this judging circuit 20, as represented in FIG. 12, "a degree of movement" with respect to the successive images which are successively read from the semiconductor memory 22, and thereafter one image having the lowest degree of movement is selected, which will be then reported to the memory control circuit 23. It should be understood that various detection methods for the above-explained "a degree of movement" have been proposed, and such a detecting program may be previously stored in ROM employed in this judging circuit 20. As the detecting methods, there are known, for instance, Japanese patent publication No. 60-46878 published on Oct. 18, 1985 by Hitachi Co., Ltd. However, more simple detecting method is preferable for the present invention. For instance, "Moving picture detecting methods" as described in Japanese patent disclosure No. 1-218284 (1989) filed by the Applicant may be utilized in the third preferred embodiment. It should be noted that numerals such as "2" and "3" denote a relative magnitude of "a degree of movement", represented in FIG. 12.

Thus, the judging circuit 20 detects the moving vectors of the respective images based on the above-described detecting principle so as to obtain "a degree of movement" (step E6). Thereafter, the image having the lowest degree of movement, namely the best quality of image containing the most less blurring phenomenon is selected and this selection result is reported to the memory control circuit 23 (step E7). In case that there are several images having the substantially same image qualities, i.e., the most less blurring phenomenon, a selection is made in one image which has been taken at the time instant very close to the shutter operation timing. Then, the memory control circuit 23 addresses the image data among the image data stored in the semiconductor memory 23, which has been selected by the judging circuit 20, so as to read the addressed image data. This addressed image data is further transferred to the D/A converting circuit 25. The D/A converting circuit 25 converts the addressed image data into the analog image signal and outputs this analog image signal via the signal line "b". At this time, the control circuit 24 instructs the display control circuit 18 so as to select the signal line "b", and also maintains the ON-state of the switch SW3 for a predetermined time period. Under the control of the display control circuit 18, the analog image signal derived from the D/A converting circuit 25 is selected and displayed on the monitor 34 in response to the instruction of the control circuit 24. As a result, the photographer can confirm the image selected by the judging circuit 20 by observing it on the monitor 34. Since the switch SW3 is turned ON, the image data read from the semiconductor memory 22 is modulated by the modulating circuit 19. Thus, the modulated image data is sent to the recording circuit 26 whereby it is recorded on the floppy disk 28 by the recording head 27a (step E8).

As previously explained, in the before/after photographing mode, when the shutter button 15 is depressed, a plurality of images which have been taken before and after the shutter operation are stored together with the image taken by the shutter with the image taken by the shutter operation in the semiconductor memory 22. Furthermore, the image having the most less blurring phenomenon can be automatically selected from these images stored in the semiconductor memory 22, which will be then recorded on the floppy disk 28.

When the image recorded on the floppy disk 28 is reproduced, the reproducing mode is designated. Once the reproducing mode is designated, the control circuit 24 instructs the display control circuit 18 to select the signal line "c", and reads the image data firstly recorded on the floppy disk 28 by the reproducing head 27b. The read image data is amplified by the reproducing circuit 31 and then input into the demodulating circuit 32 for the demodulating purpose The signal demodulated by this demodulating circuit 32 is input into the encoder 33 so as to be returned to the originally produced luminance signal "Y" and color difference signals "R-Y" and "B-Y" which will then be supplied via the signal line "c" to the display control circuit 18. This display control circuit 18 selects the image signal transferred from the encoder 33 in accordance with the instruction by the control circuit 24, and supplies this selected image signal to the monitor 34 for the display purpose. Also, under this condition, when the forward key is operated, the images recorded on the floppy disk 28 are successively read and displayed on the monitor 34.

In the above-described third preferred embodiment, the image data which have been acquired for several seconds before and after the shutter button is depressed are stored in the semiconductor memory 22 in order to select the better quality image having no blurring phenomenon. Alternatively, after the shutter button has been depressed and the imaging operation is stopped. Then, the image data which have been acquired for several seconds until the shutter operation is performed may be selected to find out the better quality image having no blurring phenomenon. Also, the image data which have been acquired for several seconds after the shutter operation was effected may be selected to find out the image having no blurring phenomenon.

In the third preferred embodiment, the shutter 12 was controlled every 1/60 seconds alternatively, this shutter control time may be substituted by other values.

Also, both the image having the least blurring phenomenon and the original image acquired when the shutter is actually depressed may be record.

While has been described in detail, according to the third preferred embodiment of the invention, the image memory capable of a large quantity of image data is employed. When an operator touches with his finger on the shutter button, the photographing operation is commenced and then the image data are successively stored on the image memory. After the shutter button is depressed, a selection is made to find out the image having the least blurring phenomenon from a plurality of image data which have been stored in the image memory. Then, the selected image having the better image quality is recorded on the recording medium such as the floppy disk. As a result, even if the blurring phenomenon occurs when the shutter button is depressed, the image data having the best image quality is selected from a plurality of image data stored in the image memory and therefore the image having the best image quality can be continuously obtained.

FOURTH ELECTRONIC STILL CAMERA

A major feature of an electronic still camera according to a fourth preferred embodiment of the invention will now be described. An image memory capable of storing a plurality of photographed image data is employed; the image data which have been taken before and after a shutter button is depressed are stored in this image memory; a photographed image taken when the shutter button is depressed is recorded on an image recording medium; and further a judgement is made whether or not this recorded image has the blurring phenomenon by comparing this recorded image with other photographed images which have been stored in the image memory. When the blurring phenomenon occurs in the recorded image, a warning is given to a photographer.

In the fourth electronic still camera with the above arrangement, when a photograph is taken, a judgement can be automatically done whether or not the blurring phenomenon occurs in the photographed image. If the image has the blurring phenomenon, the warning can be immediately given to the photographer. As a result, the photographer can immediately become aware of the occurrence of the blurring phenomenon in the taken picture. Then, the photographer may take again a picture, if required.

WARNING OPERATION OF FOURTH ELECTRONIC STILL CAMERA

Figure 13:
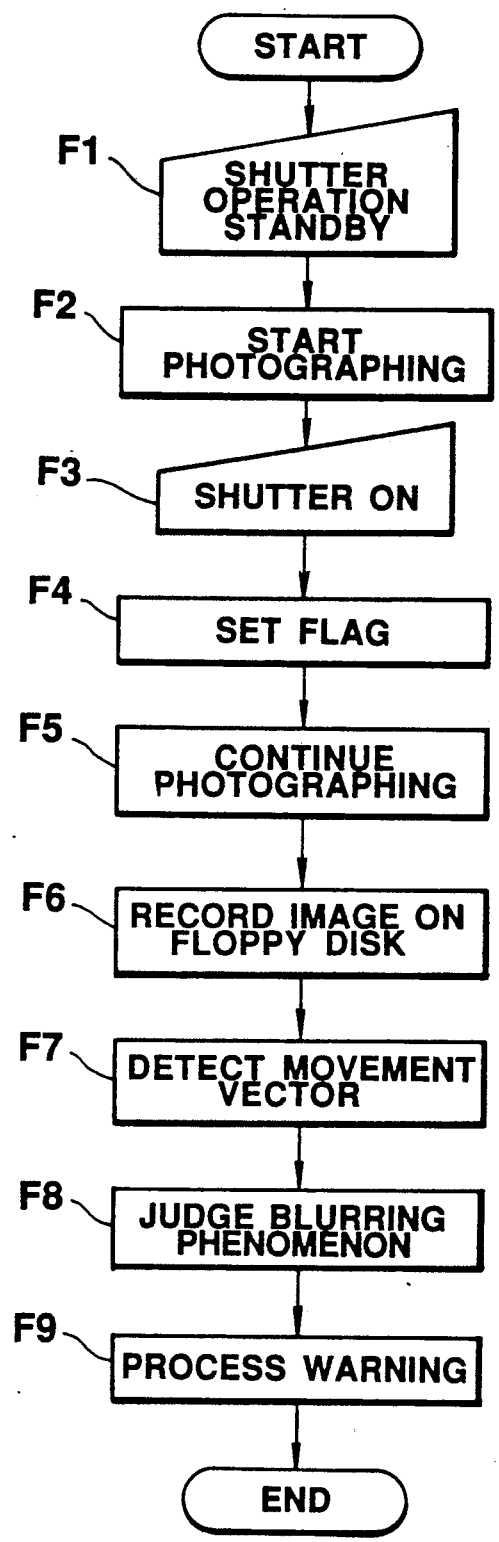
FIG. 13 is a flowchart for explaining an operation according to a fourth preferred embodiment.

Referring now to a flowchart shown in FIG. 13, an operation of the fourth electronic still camera will be described. It should be noted that since the overall arrangement of the fourth electronic still camera is the same as that of the third preferred embodiment as shown in FIG. 10, no further explanation thereof is made.

When the photographing operation is commenced, the photographing mode is designated by operating the operation mode designating key employed in the input unit 35.

When this photographing mode is designated, the control circuit 24 performs the following process. Under the control of the control circuit 24, the photographing mode signal is output to both memory control circuit 23, and the switches SW1 and SW3 are turned OFF as well as the switch SW2 is turned ON, and further an instruction is supplied to the display control circuit 18 so as to select the signal line "a". Under these conditions, when the photographer softly touches on the shutter button 15 by his finger (step F1), the touch signal is sent to the shutter control circuit 14 and the process is advanced to the shutter standby mode. Upon receipt of the touch signal, the shutter control circuit 14 controls the auto focusing mechanism and automatic exposure mechanism to execute the focusing and exposure controls, and actuates the shutter 12 at the rate of 1/10 sec. (step F2). Thus, the image of the object under imaging is projected via the lens 11 and shutter 12 onto the imaging surface of the imaging element 13, both the luminance signal "Y" and color difference signals "R-Y" and "B-Y" are output from the imaging element 13 in response to the projected image, and then via the signal line "a" to the display control circuit 18. The display control circuit 18 selects the signal transferred from the signal line "a" in response to the control circuit 24 and displays the image on the monitor 34. Based upon this monitor display, the photographer can confirm the conditions of the imaging object so that he can depress the shutter button 15. Furthermore, the image signal output from the signal process circuit 17 is input via the switch SW2 to the A/D converting circuit 21, and converted into the digital image data into the semiconductor memory 22. In this case, the touch signal of the shutter button 15 is supplied from the shutter control circuit 14 to the memory control circuit 23. While the touch signal is supplied, the memory control circuit 23 enables the image data output from the A/D converting circuit 21 to be sequentially written into the semiconductor memory 22. When 10 sheets of image data have been written into the semiconductor memory 22, the image data rewriting operation is successively executed from the image data which has been written at first. That is, the image data are sequentially updated.

Then, when the photographer depresses the shutter button 15 (step F3), the ON-signal is sent via the signal line 16b to the shutter control circuit 15. Upon receipt of this ON-signal, the shutter control circuit 14 outputs the ON-signal to the memory control circuit 23 and control circuit 24, and thereafter continues the shutter control operation for one second. When the shutter ON-signal is sent from the shutter control circuit 14, the memory control circuit 23 sets the shutter flag "F" to the flag area 22b with respect to the image which has been recorded at 1/120 sec. in the semiconductor memory 22 as similar to those shown in FIG. 2 (step F4). Thereafter, the writing operation of the image data to the semiconductor memory 22 is continued at a predetermined time interval for one second (step F5). Accordingly, when the shutter button 15 is depressed, 10 sheets of the image which have been acquired before depressing the shutter button 15, and 10 sheets of the images which have been acquired after depressing the shutter button 15 are stored in the semiconductor memory 22 together with the image taken at the shutter operation.

On the other hand, upon receipt of the above-described shutter-ON signal supplied from the shutter control circuit 14, the control circuit 24 maintains the ON-state of the switch SW1 only for 1/120 seconds, and transfers to the modulating circuit 19 both the luminance signal "Y" and color difference signals "R-Y" and "B-Y" with respect to the photographed image output from the signal process circuit 17 during the shutter-ON state. This modulating circuit 19 modulates the image signal sent from the signal process circuit 17 and thereafter outputs the modulated image signal to the recording circuit 26, whereby this modulated image signal is recorded via the recording head 27a on the floppy disk 28 (step F6).

Thus, when the photographed image data have been written into the semiconductor memory 22, the image data to which the shutter flag "F" has been set and also several pieces of the image data acquired before and after the shutter operation are read from the semiconductor memory 22 and output into the judging circuit 20 under the control of the memory control circuit 23. Similar to the judging operation as shown in FIG. 12, the judging circuit 20 compares the image data to which the shutter flag "F" has been set with other image data which have been taken before and after the shutter operation, so as to detect the movement vector, whereby "a degree of movement" among the images can be obtained (step F7). Thus, a judgement can be done whether or not the blurring phenomenon occurs in the photographed image by comparing this degree of movement with a predetermined set value (step F8). For instance, if the degree of movement is more than 3, then the blurring phenomenon occurs in the judged image.

Thus, the judging circuit 20 judges whether or not the blurring phenomenon occurs in the image data which has been taken when the shutter button 15 is depressed, based upon the above-described judging basis. If the blurring phenomenon occurs in this image data, a buzzer "BZ" (not shown in detail) is energized for a predetermined time period by the judging circuit 20, which will give a warning to the photographer.

When such a warning is given to the photographer, he can immediately take another picture again.

Alternatively, the other image data which have been stored in the semiconductor memory 22 may be sequentially read by operating either the forward key, or backward key so as to display the read image on the monitor 34. Then, the arbitrary image may be selected and recorded on the floppy disk 28. Otherwise, the image data which has the least blurring phenomenon, i.e., the best image quality is selected from the image date stored in the semiconductor memory 22 so as to be recorded on the floppy disk 28 under the control of the semiconductor memory 22.

When the image recorded on the floppy disk 28 is reproduced, the reproducing mode is designated. Once the reproducing mode is designated, the control circuit 24 instructs the display control circuit 18 to select the signal line "c", and reads the image data firstly recorded on the floppy disk 28 by the reproducing head 27b. The read image data is amplified by the reproducing circuit 31 and then input into the demodulating by this demodulating circuit 32 is input into the encoder 33 so as to be returned to the originally produced luminance signal "Y" and color difference signals "R-Y" and "B-Y" which will then be supplied via the signal line "c" to the display control circuit 18. This display control circuit 18 selects the image signal transferred from the encoder 33 in accordance with the instruction by the control circuit 24, and supplies this selected image signal to the monitor 34 for the display purpose.

It should be understood that if a circuit similar to the fourth preferred embodiment is assembled in the view finder system of the traditional film type camera, the present invention may be realized. As a consequence, it should be noted that the "electronic still camera" as described in the present invention implies any types of camera including the electronically controlled film type camera.

When a moving object such as an automobile is photographed by the fourth electronic still camera, the warning is necessarily produced. Therefore, in such a case, this warning is ignored, or an ON/OFF mode for the blurring phenomenon detecting function is employed.

As previously described in detail, according to the fourth preferred embodiment, since a judgement can be done whether or not the blurring phenomenon occurs when the shutter button is depressed so as to take a picture, and if the blurring phenomenon occurs, the warning is given, the photographer can immediately take the proper measures, for instance, can take again another picture. As a result, the photographer can take a picture without being anxious about the blurring phenomenon.

FIFTH ELECTRONIC STILL CAMERA

A major feature of an electronic still camera according to a fifth preferred embodiment is as follows. An image memory capable of a plurality of photographed image data is employed; a shutter speed/exposure is determined under the shutter standby condition; and when the shutter button is depressed, the photographing operation is continuously performed while varying the previously determined shutter speed/exposure to store the resultant photographed image data into the image memory. After a predetermined quantity of image data have been acquired, the plural images stored in the semiconductor memory are displayed on the monitor. A selection is made to the photographed images which are successively displayed on the monitor, and the selected image is recorded on the recording medium.

In accordance with the fifth electronic still camera with having the above features, a plurality of photographs are taken with varying the shutter speed/exposure by depressing the shutter button only one time, and are stored in the image memory. The plural photographed images which have been stored in the image memory are successively read in response to the key operations so as to be displayed on the monitor. As a result, image contents can be confirmed from the displayed images, and a desired image is selected therefrom, whereby the selected image is recorded on the recording medium.

Therefore, a photographer can select the image data having the best image quality from the plural image data which have been acquired under the various photographing conditions, and record this best image data on the recording medium.

VARYING SHUTTER SPEED/EXPOSURE

It should be noted that since the overall arrangement of the fifth preferred embodiment is the same as the first preferred embodiment shown in FIG. 1, explanations thereof is omitted.

When a photographing operaiton is carried out with the fifth electronic still camera, the photographing mode is designated by operating the key provided in the key input unit 35, and also either normal photographing mode, or a corrected photographing mode is arbitrarily selected. Referring now to a flowchart represented in FIG. 14, a description will be made to such a case that the corrected photographing mode is designated.

Figure 14:
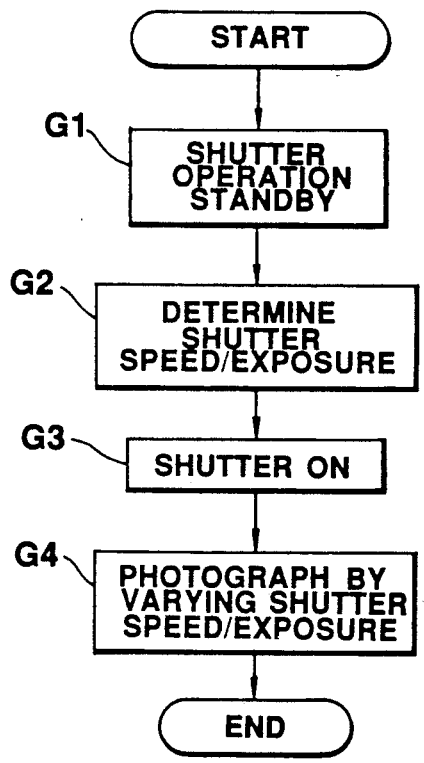
FIG. 14 is a flowchart for explaining an operation according to a fifth preferred embodiment; and, FIG. 15 represents a relationship between exposure conditions and shutter speeds according to the fifth preferred embodiment.

Upon designation of the corrected photographing mode, the cotnrol circuit 24 starts a control operation as defined in a flowchart shown in FIG. 14. That is, this control circuit 24 outputs a corrected photographing mode signal to the shutter control circuit 14 and memory control circuit 23 when the corrected photographing mode is designated, and turns OFF these switches SW1, SW2, SW3 and furthermore instructs the display control circuit 18 to select the signal line "16a". Under this condition, when a photographer softly touches on the shutter button 15 with his figure (step G1), the touch signal is sent via the signal line "16a" to the shutter control circuit 14. Upon receipt of the touch signal, the shutter control circuit 14 becomes a standby mode, and controls the auto-focusing mechanism and automatic exposure mechanism so as to adjust both the focusing and exposure, and also actuates the shutter 12 at a rage of 1/60 sec. (step G2). As a result, the image of the object (not shown) to be photographed is optically projected via the lens 11 and shutter 12 onto the imaging surface of the imaging element 13. Then, both the luminance signal "Y", and color difference signals "R-Y" and "B-Y" are output from this imaging element 13 in accordance with the projected image, and are transferred via the signal line "a" to the display control circuit 18. The display control circuit 18 selects the signal sent via the signal line "a" in response to the instruction from the control circuit 24 and supplies this selected signal to the monitor 34 for the display purpose. The photographer can confirm the conditions of the object to be imaged by observing the monitor, so that the shutter operation is prepared.

When the photographer depresses the shutter button 15 (step G3), the ON-signal is sent via the signal line "16b" to the shutter control circuit 14. Upon receipt of the ON signal, the shutter control circuit 14 outputs this ON signal to the memory control circuit 23 and the control circuit 24, and thereafter performs the photographing operation under the shutter speed and exposure which have been set when the shutter button 15 was touched, as represented in FIG. 15. Subsequently, the photographing operation is continued several times by changing the shutter speed/exposure conditions with respect to the above-described set values (step G4).

FIG. 15 represents a relationship between the shutter speeds and exposure values during the photographing operations. As apparent from FIG. 15, the shutter speed is varied into three steps, i.e., "a set speed", "−1 speed", and "+1 speed". The exposure values are changed into "a set exposure", "−1 step", and "+1 step" at the respective shutter speeds. In accordance with the fifth preferred embodiment, 9 sheets of photographs taken under the different photographing conditions are obtained by varying the shutter speed and also exposure conditions, as previously described.

On the other hand, while the above-described photographing process is carried out, the control circuit 24 maintains the ON-state of the switch SW2. As a consequence, both the luminance signal "Y" and color difference signals "R-Y" and "B-Y" which are output from the signal process circuit 17 by the above-described photographing process are input via the switch SW2 into the A/D converting circuit 21 so as to be converted into the corresponding digital signals. Then, 9 sheets of the image data output from the A/D converting circuit 21 are sequentially written into the semiconductor memory 22 under the control of the memory control circuit 23.

After the image data have been written into the semiconductor memory 22, the control circuit 24 turns OFF the switch SW2, instructs the memory control circuit 23 to read out the image data from the semiconductor memory, and further instructs the display control circuit 18 to select the signal line "b". Under the control of the memory control circuit 23, in response to the instruction of the control circuit 24, the image data at the head address of the semiconductor memory 22, namely the image which has been taken at the reference (set) shutter speed/exposure is read out and then out via the signal line "b" to the display control circuit 18 and then displayed on the monitor 34. Under the condition, when the forward key of the key input unit 35 is operated, the photographed image data which have been stored in the semiconductor memory 22 are successively read out under the control of the memory control circuit 23, and then displayed via the display control circuit 18 on the monitor 34. The photographer selects the image having the best image quality from 9 sheets of the photographed images stored in the semiconductor memory 22 by operating either the forward key or backward key, and thereafter operates the recording key while this selected image is being displayed on the monitor 34. When the recording key is operated, the control circuit 24 turns ON the switch SW3 for a predetermined time period, and outputs the image signal which is read and converted by the semiconductor memory 22 and D/A converting circuit 25, to the modulating circuit 19. This modulating circuit 19 modulates the image signal sent from the D/A converting circuit 25 and outputs the modulated image signal to the recording circuit 26 so as to record this image signal on the floppy disk 20. As previously described in detail, the photographing operation is carried out in the corrected photographing mode by the fifth electronic still camera. Since a plurality of photographed images are taken by only one shutter operation during this corrected photographing mode, such a photographing operation is preferably performed by utilizing a tripod.

In case that the normal photographing mode is designated, the switch SW1 is turned ON for a predetermined time every time the shutter button 15 is operated. The image signal output from the signal process circuit 17 is transferred to the modulating circuit 19 and recorded via the recording head 27a on the floppy disk 28 under the control of the recording circuit 28.

When the image recorded on the floppy disk 28 is reproduced, the reproducing mode is designated. Once the reproducing mode is designated, the control circuit 24 instructs the display control circuit 18 to select the signal line "c", and reads the image data firstly recorded on the floppy disk 28 by the reproducing head 27b. The read image data is amplified by the reproducing circuit 31 and then input into the demodulating circuit 32 for the demodulating purpose. The signal demodulating by this demodulating circuit 32 is input into the encoder 33 so as to be returned to the originally produced luminance signal "Y" and color difference signals "R-Y" and "B-Y" which will then be supplied via the signal line "c" to the display control circuit 18. This display control circuit 18 selects the image signal transferred from the encoder 33 in accordance with the instruction by the control circuit 24, and supplies this selected image signal to the monitor 34 for the display purpose.

It should be noted that althrough the semiconductor memory 22 is employed as the image memory in the fifth electronic still camera, other proper memory devices such as a magnetic tape, a floppy disk may be of course employed as the image memory.

Also, in the fifth preferred embodiment, the digital image signals are recorded on the floppy disk 28. Alternatively, these digital image signals may be first converted into analog image signals and thereafter recorded on a film.

While has been described in detail, according to the fifth electronic still camera, since a plurality of photographed images are acquired with the different photographing conditions by depressing the shutter button one time, these photographed images are confirmed on the monitor so as to select the image having the best image quality and record the selected best image on the recording medium. As a result, even when the photographing operation is carried out by utilizing the full automatic camera mechanism, the images having the best image quality can be always obtained and therefore the waste use of the recording medium can be avoided.

What is claimed is:

1. An electronic still camera including photographing means and a shutter, comprising:
    photographing control means including means for detecting a shutter standby condition, means responsive to said means for detecting a shutter standby condition for photographing images and for generating image data corresponding to a plurality of images at a predetermined time interval, means for detecting a shutter operation, and means responsive to said means for detecting a shutter operation for photographing an image and for generating image data corresponding to a single image;
    temporary storage means including a semiconductor memory for temporarily storing the image data generated by said photographing control means, wherein the image data generated corresponding to images photographed responsive to said shutter standby condition are discriminated from the image data generated corresponding to images photographed responsive to said shutter operation;
    non-volatile storage means including a non-volatile memory; and
    selecting means for selectively transferring one image data corresponding to one of said image data stored in said temporary storage means from said temporary storage means to stored said non-volatile storage means, for storage therein as a selected photographed image.

2. An electronic still camera according to claim 1, wherein said non-volatile storage means stores said image data corresponding to said single image photographed during the shutter operation.

3. An electronic still camera according to claim 1, wherein:
    said non-volatile storage means stores said image data corresponding to said single image photographed during the shutter operation;
    and said selecting means includes means for selecting one image data corresponding to one of said plurality of images stored in said temporary storage means, for transferring said one selected image data from said temporary storage means to said non-volatile storage means, and for replacing said image data corresponding to said single image with said one transferred image data in said non-volatile storage means.

4. An electronic still camera according to claim 1, further comprising:
    display means for displaying said plurality of image data which have been stored in said temporary storage means.

5. An electronic still camera according to claim 1, further comprising:
    display means for displaying said single image which has been photographed responsive to detection of the shutter operation.

6. An electronic still camera according to claim 1, wherein said photographing control means photographs one image responsive to a detected shutter operation, and thereafter photographs a plurality of images at a predetermined time interval.

7. An electronic still camera according to claim 1, wherein said photographing control means photographs one image responsive to a detected shutter operation, and thereafter photographs another image.

8. An electronic still camera including photographing means and a shutter, said shutter being operable to perform a shutter operation to photograph an image, and also being operable to a shutter standby condition, said still camera further comprising:
    first photographing control means for photographing an image and for generating image data corresponding to a single photographed image responsive to a detected shutter operation;
    second photographing control means for photographing at least one image and for generating image data corresponding to said at least one photographed image responsive to a detected shutter standby condition;
    selecting means for selecting one image data generated by said first and second photographing control means, said one selected image data corresponding to one of said photographed images; and storage means for storing the one selected image data.

9. An electronic still camera including photographing means and a shutter, said shutter being operable to perform a shutter operation to photograph an image, and also being operable to a shutter standby condition, said still camera further comprising:

first photographing control means for photographing an image and for generating image data corresponding to a single image photographed image responsive to a detected shutter operation;

second photographing control means for photographing at least one image and for generating image data corresponding to said at least one photographed image after said first photographing control means generates image data corresponding to said single photographed image;

selecting means for selecting one image data generated by one of said first and second photographing control means, said one selected image data corresponding to one of said photographed images; and storage means for storing the one selected image data selected by said selecting means.

10. An electronic still camera including photographing means and a shutter, comprising:

photographing control means for photographing a plurality of images and for generating a plurality of corresponding image data responsive to one detected shutter operation; and non-volatile storage means for selectively storing a plurality of image data corresponding to said plurality of photographed images which is generated by said photographing control means.

11. An electronic still camera including photographing means and a shutter, comprising:

photographing control means for photographing a plurality of images and generating a plurality of corresponding image data responsive to one detected shutter operation;

temporary storage means for temporarily storing said plurality of image data taken by said photographing control means;

selecting means for selecting one image data from among said plurality of image data temporarily stored in said temporary storage means; and second storage means for storing said selected image data selected by said selecting means as a selected photographed image.

12. An electronic still camera according to claim 11, wherein said photographing control means includes:

means for changing a shutter speed to various values which photographing a plurality of images.

13. An electronic still camera according to claim 11, wherein said photographing control means includes:

means for changing an exposure to various values which photographing a plurality of images.

14. An electronic still camera according to claim 11, wherein said photographing control means includes:

means for transferring the generated image data from said temporary storage means to said second storage means for storage therein; and means for directly storing the generated image data in said second storage means.

15. An electronic still camera having a shutter, comprising:

imaging means for photographing a plurality of images and for generating a corresponding plurality of image data responsive to one detected shutter operation;

first storage means including a semiconductor memory, for storing said plurality of image data which has been generated by said imaging means;

display means for displaying the image data stored in the first storage means as a visual image;

key input means for producing a key input signal;

display selecting means for selecting at least one of said plurality of image data stored in said first storage means in accordance with a key input signal of said key input means; and second storage means including a non-volatile memory, for storing the image data selected by said display selecting means.

16. An electronic still camera according to claim 15, wherein said display means includes:

means for displaying a selected image which has been photographed during the shutter operation as a still image.

17. An electronic still camera according to claim 15, wherein said display means includes:

an electronic view finder.

18. An electronic still camera comprising:

imaging means including optical means and an imaging element;

photographing control means for controlling said imaging means to photograph a plurality of images and to generate a plurality of image data corresponding to said plurality of images at a time period less than a television field period, responsive to a single shutter operation;

first storage means including a memory accessible at a high speed, for sequentially storing said plurality of image data corresponding to said plurality of photographed images generated by said imaging means under the control of said photographing control means at the time period less than the television field period;

second storage means including a memory accessible at an access speed slower than that of said first storage means for storing the image data read out from said first storage means; and video output means for outputting the image data which have been stored in said second storage means at a timing in synchronism with the television field period.

19. A still camera including an electronic view finder, comprising:

imaging means;

temporary storage means including a semiconductor memory for temporarily storing image data;

means for causing an image photographed by said imaging means to be temporarily stored in said temporary storage means and for displaying said image on said electronic view finder;

optical means; and means for recording on a photosensitive film an image photographed by said optical means by operating a shutter, and also for displaying on said view finder as a still image the image which has been photographed by said imaging means and has been temporarily stored in said temporary storage means.

20. A still camera including a semiconductor memory, comprising:

optical means;

means for recording on a film an image photographed by said optical means while operating a shutter;
imaging means;
temporary storage means including of a semiconductor memory for temporarily storing image data;
control means for causing image data photographed by said imaging means to be temporarily stored in said temporary storage means;
detecting means for detecting a blurring phenomenon based upon the image data temporarily stored in said temporary storage means; and
means for announcing a warning when the blurring phenomenon is detected by said detecting means.

21. An electronic still camera comprising:
imaging means for generating image data corresponding to at least one image;
temporary storage means including a semiconductor memory for temporarily storing said image data generated by said imaging means;
detecting means for detecting a blurring phenomenon based upon the image data temporarily stored in said temporary storage means; and
announcing means for announcing a warning when the blurring phenomenon is detected by said detecting means.

22. An electronic still camera according to claim 11, wherein said second storage means comprises a nonvolatile storage device.

23. An electronic still camera according to claim 14, wherein said second storage means comprises a nonvolatile storage device.

24. An electronic still camera including photographing means and a shutter, comprising:
photographing control means for photographing a plurality of images responsive to one detected shutter operation, and for generating a plurality of image data corresponding respectively to the photographed images;
temporary storage means for temporarily storing said plurality of image data generated by said photographing control means;
selecting means for selecting one image data from among said plurality of image data temporarily stored in said temporary storage means;
said selecting means including movement detecting means for detecting a degree of movement between a plurality of image data which have been stored in said temporary storage means; and
second storage means for storing said selected image data selected by said selecting means.

25. An electronic still camera according to claim 24, wherein said selecting means includes means for selecting image data which has been judged by said movement detecting means as image data having the least movement degree.

26. An electronic still camera including photographing means and a shutter, comprising:
photographing control means for photographing a plurality of images responsive to one detected shutter operation, and for generating a plurality of image data corresponding respectively to the photographed images;
temporary storage means for temporarily storing said plurality of image data generated by said photographing control means;
selecting means for selecting one image data from among said plurality of image data temporarily stored in said temporary storage means;
said selecting means including judging means for judging image data having the least blurring phenomenon among said plurality of image data temporarily stored in said temporary storage means; and
second storage means for storing said selected image data selected by said selecting means.

27. An electronic still camera according to claim 26, wherein said judging means includes means for judging a magnitude of the blurring phenomenon by detecting a degree of movement among said plurality of image data temporarily stored in said temporary storage means.

28. An electronic still camera including photographing means and a shutter, comprising:
photographing control means for photographing a plurality of images responsive to one detected shutter operation, and for generating a plurality of image data corresponding respectively to the photographed images;
temporary storage means for temporarily storing said plurality of image data generated by said photographing control means;
selecting means for selecting one image data from among said plurality of image data temporarily stored in said temporary storage means;
said selecting means including blurring phenomenon detecting means for detecting blurring phenomena of said plurality of image data temporarily stored in said temporary storage means; and
second storage means for storing said selected image data selected by said selecting means.

29. An electronic still camera according to claim 28, further comprising means for announcing a warning when said blurring phenomenon detecting means detects a blurring phenomenon.

30. A still camera including a semiconductor memory, comprising:
optical means for photographing an image;
means for recording on a film an image photographed by said optical means while operating a shutter;
imaging means for generating image data corresponding to a photographed image;
temporary storage means including a semiconductor memory for temporarily storing image data;
control means for causing image data generated by said imaging means to be temporarily stored in said temporary storage means;
detecting means for detecting a blurring phenomenon based upon the image data temporarily stored in said temporary storage means; and
means for announcing a warning when the blurring phenomenon is detected by said detecting means.

31. An electronic still camera comprising:
imaging means for generating image data corresponding to at least one photographed image;
temporary storage means including a semiconductor memory for temporarily storing said image data generated by said imaging means;
detecting means for detecting a blurring phenomenon based upon the image data temporarily stored in said temporary storage means; and
announcing means for announcing a warning when the blurring phenomenon is detected by said detecting means.

* * * * *